US009561819B2

(12) United States Patent
Tuttle

(10) Patent No.: US 9,561,819 B2
(45) Date of Patent: Feb. 7, 2017

(54) SYSTEM AND METHOD FOR ACTIVELY DETERMINING A STEERING STOP ANGLE FOR A WORK VEHICLE

(71) Applicant: CNH Industrial America, LLC, New Holland, PA (US)

(72) Inventor: Thomas Tuttle, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 34 days.

(21) Appl. No.: 14/548,438

(22) Filed: Nov. 20, 2014

(65) Prior Publication Data
US 2015/0175195 A1 Jun. 25, 2015

Related U.S. Application Data

(60) Provisional application No. 61/917,990, filed on Dec. 19, 2013.

(51) Int. Cl.
B62D 6/00 (2006.01)
B62D 9/00 (2006.01)
B60G 17/016 (2006.01)
B60G 17/019 (2006.01)
B60G 17/0195 (2006.01)

(52) U.S. Cl.
CPC .............. *B62D 6/002* (2013.01); *B60G 17/019* (2013.01); *B60G 17/0162* (2013.01); *B60G 17/0195* (2013.01); *B62D 6/001* (2013.01); *B62D 9/00* (2013.01)

(58) Field of Classification Search
CPC ........... B62D 6/00; B62D 6/001; B62D 6/002; B60G 17/0162; B60G 17/019; B60G 17/0195
See application file for complete search history.

(56) References Cited

U.S. PATENT DOCUMENTS 4,225,151 A * 9/1980 Taute ...................... B62D 7/08
180/252
5,046,577 A 9/1991 Hurlburt
(Continued)

FOREIGN PATENT DOCUMENTS

EP 0598425 A1 12/1998
WO WO 8907545 8/1989

OTHER PUBLICATIONS

Agco Corporation—Product Lines Carried. (2 pages) Dated 2013. Website www.agcocorpdealers.com.

*Primary Examiner* — Truc M Do
(74) *Attorney, Agent, or Firm* — Rickard K. DeMille; Rebecca L. Henkel

(57) ABSTRACT

A method for actively determining a steering stop angle for tires associated with a front axle of a work vehicle may generally include receiving an input associated with a tire parameter for the tires, monitoring a suspension travel distance of the front axle and monitoring an oscillation angle of the front axle. In addition, the method may include determining a maximum allowable steering angle for the tires based on both the suspension travel distance and the oscillation angle of the front axle, wherein the maximum allowable steering angle corresponds to a steering angle at which clearance is maintained between the tires and at least one hood-related component of the work vehicle when the tires are moved to the maximum steering angle.

18 Claims, 10 Drawing Sheets

(56) References Cited

U.S. PATENT DOCUMENTS

| | | | |
|---|---|---|---|
| 5,297,648 A * | 3/1994 | Hansen | A01F 15/145 |
| | | | 180/424 |
| 5,322,309 A * | 6/1994 | Hurlburt | B60G 9/02 |
| | | | 180/266 |
| 5,322,310 A * | 6/1994 | Hurlburt | B60G 9/02 |
| | | | 180/266 |
| 5,340,138 A * | 8/1994 | Hurlburt | B62D 9/00 |
| | | | 180/433 |
| 5,438,515 A | 8/1995 | Miichi et al. | |
| 5,447,320 A | 9/1995 | Hurlburt | |
| 5,447,321 A * | 9/1995 | Hurlburt | B60G 9/02 |
| | | | 180/266 |
| 5,927,425 A * | 7/1999 | Kusano | B60K 23/0808 |
| | | | 180/248 |
| 6,502,840 B1 | 1/2003 | Leyonhjelm et al. | |
| 6,634,445 B2 | 10/2003 | Dix et al. | |
| 6,697,722 B2 | 2/2004 | Fujimori | |
| 7,163,079 B2 | 1/2007 | Turner et al. | |
| 7,644,942 B2 | 1/2010 | Bordini et al. | |
| 7,792,620 B2 | 9/2010 | Fritz et al. | |
| 8,280,590 B2 * | 10/2012 | Mackin | A01D 41/12 |
| | | | 701/41 |
| 8,517,394 B2 | 8/2013 | Pfiffner et al. | |
| 2013/0193658 A1 * | 8/2013 | Balboni | B60G 9/02 |
| | | | 280/93.504 |
| 2013/0240186 A1 | 9/2013 | Taras et al. | |

* cited by examiner

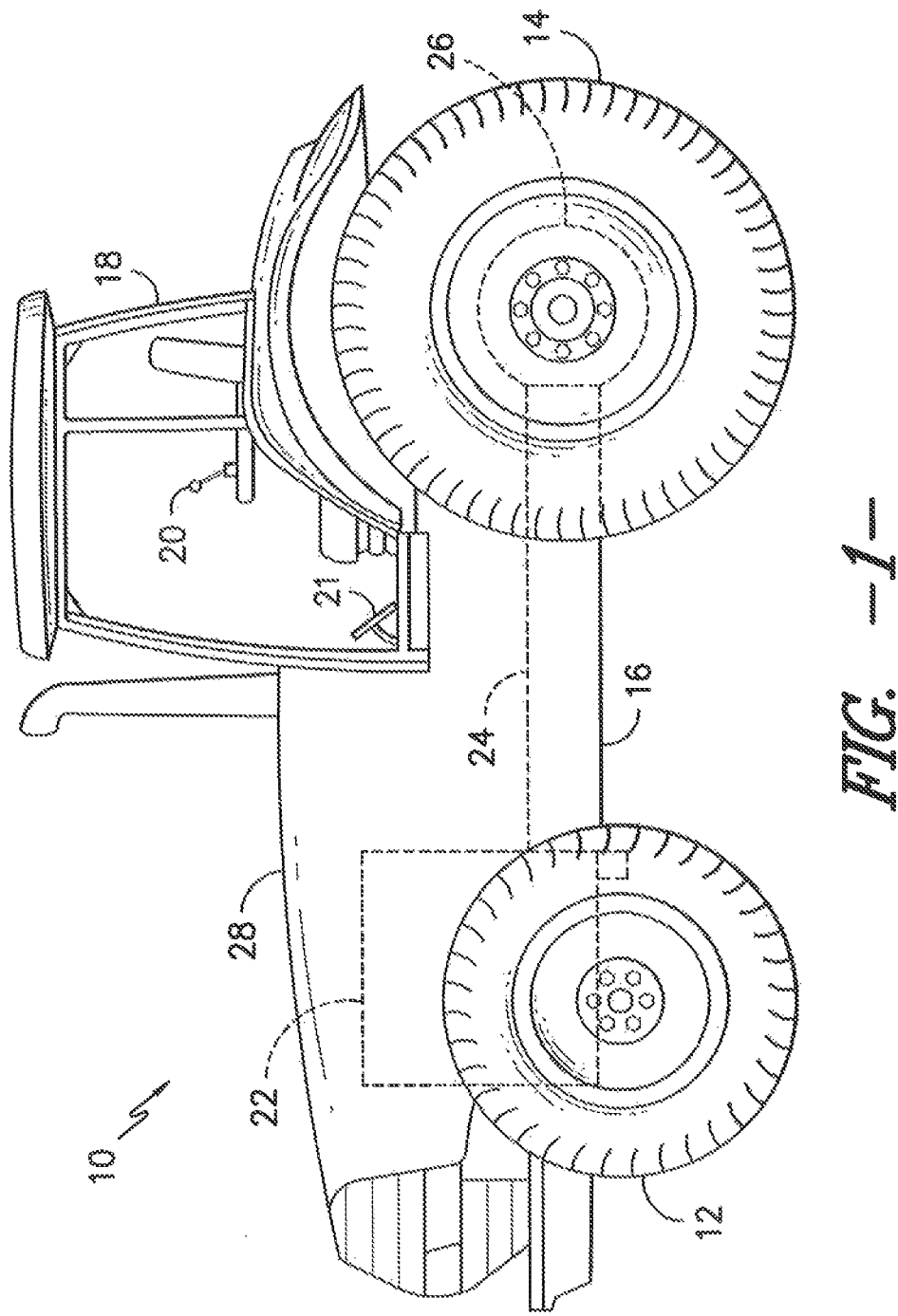
FIG. -1-

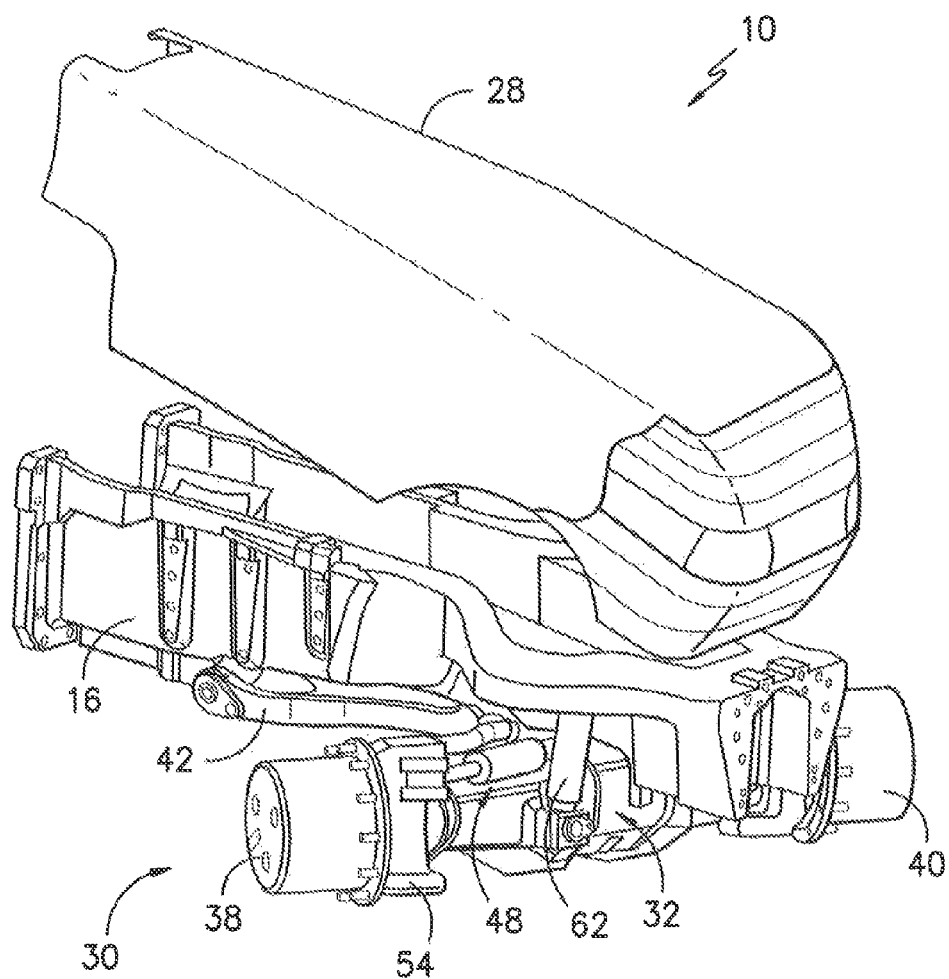
FIG. -2-

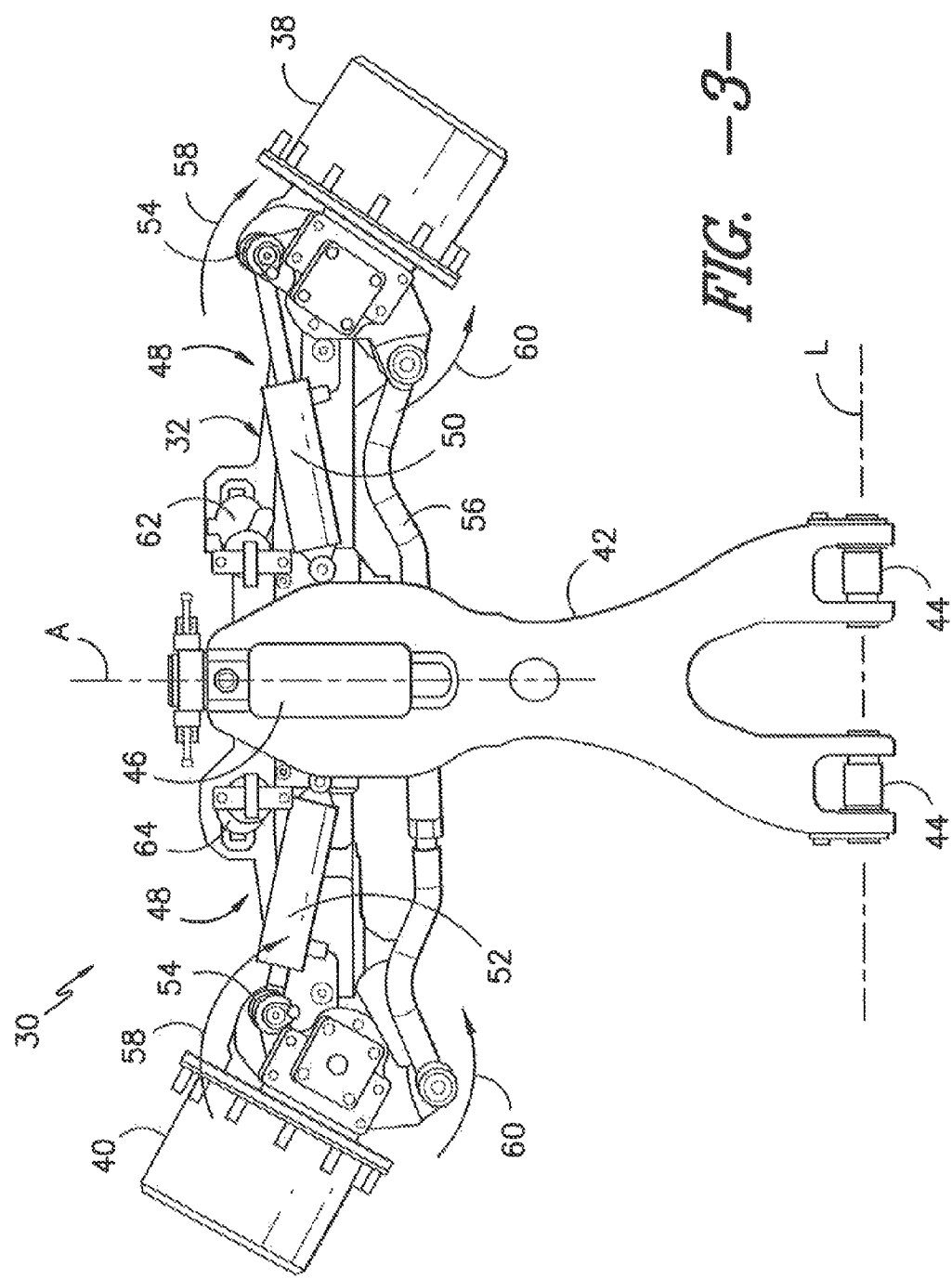
FIG. -3-

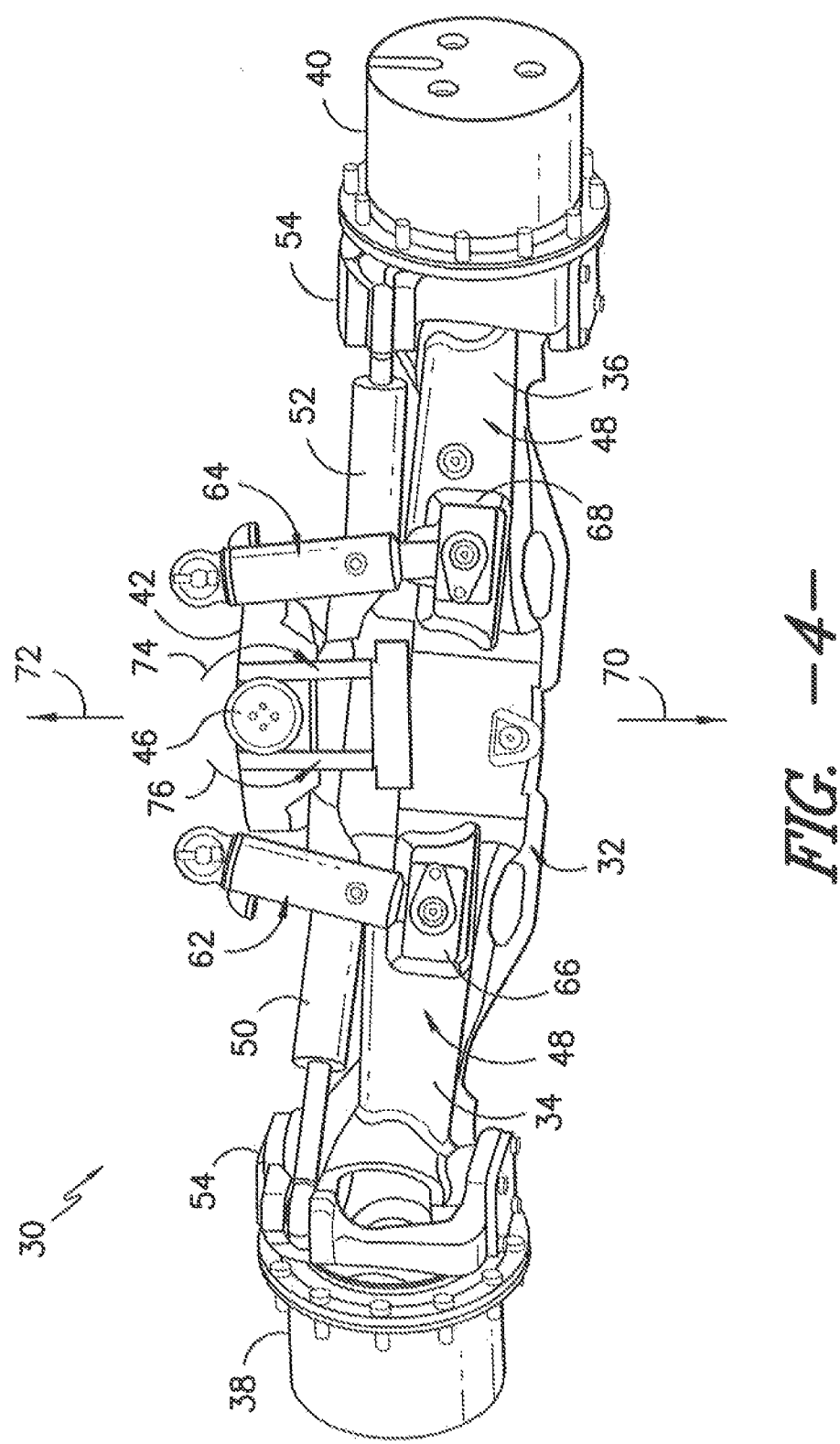
FIG. -4-

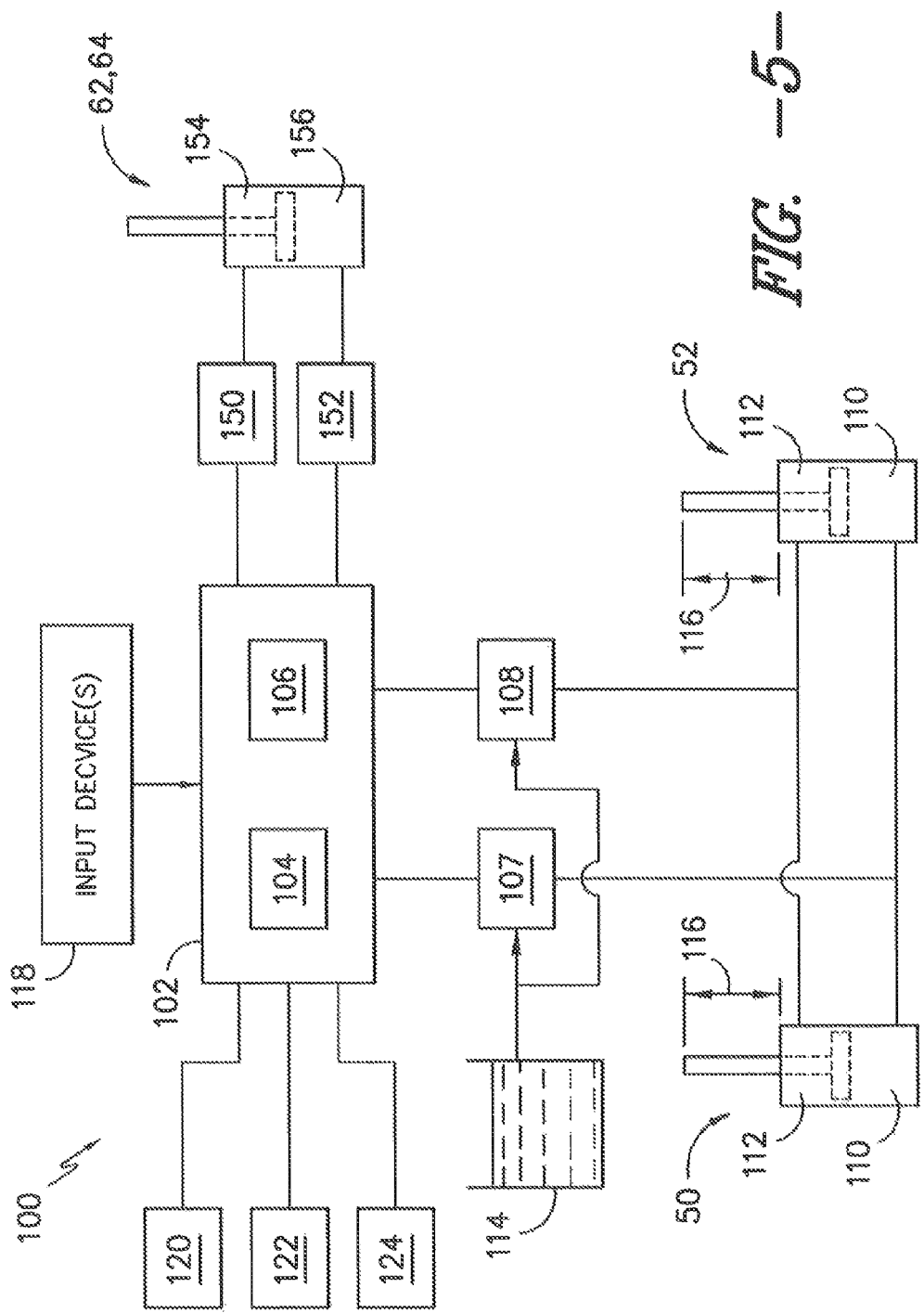
FIG. -5-

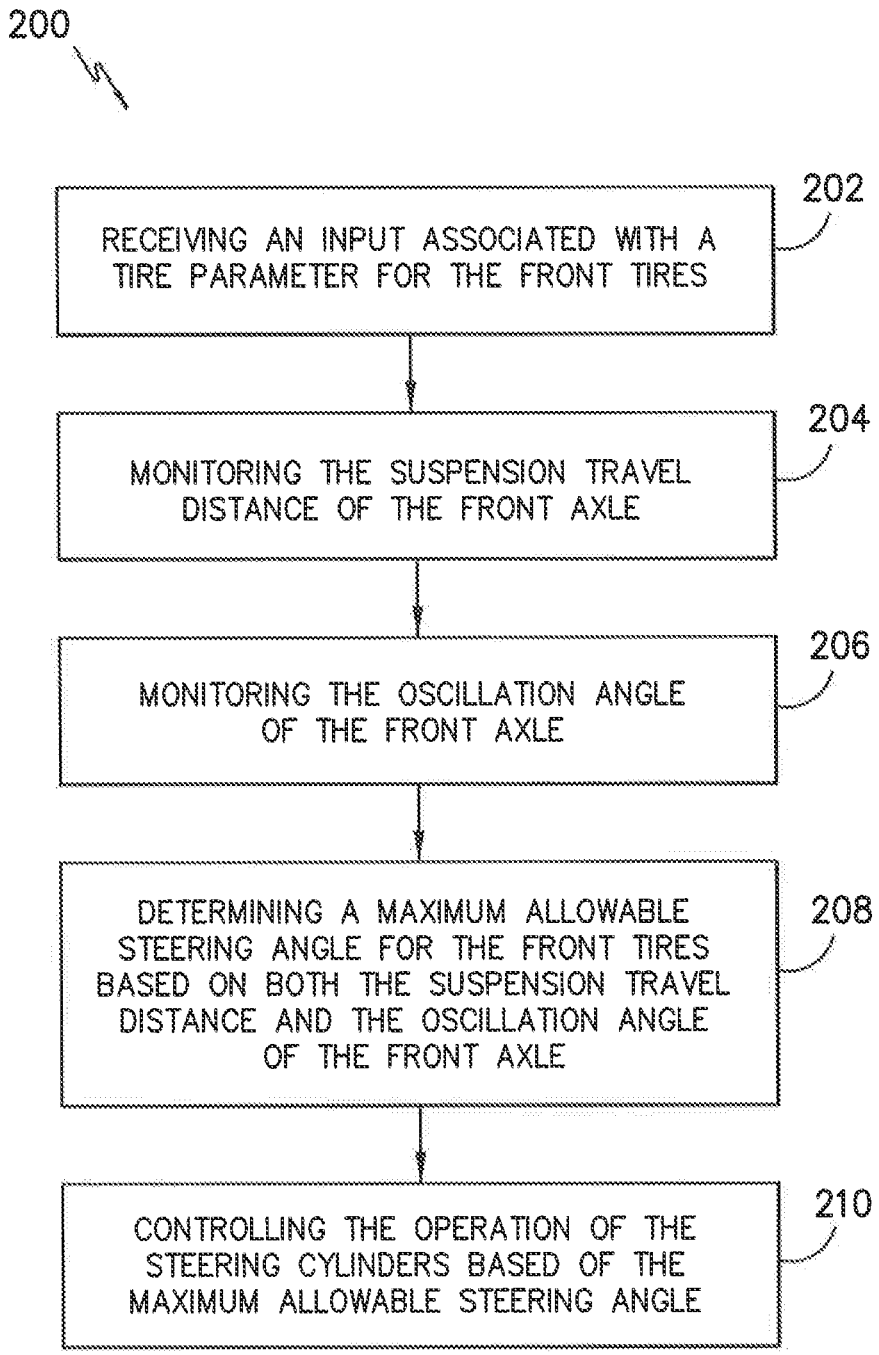
FIG. -6-

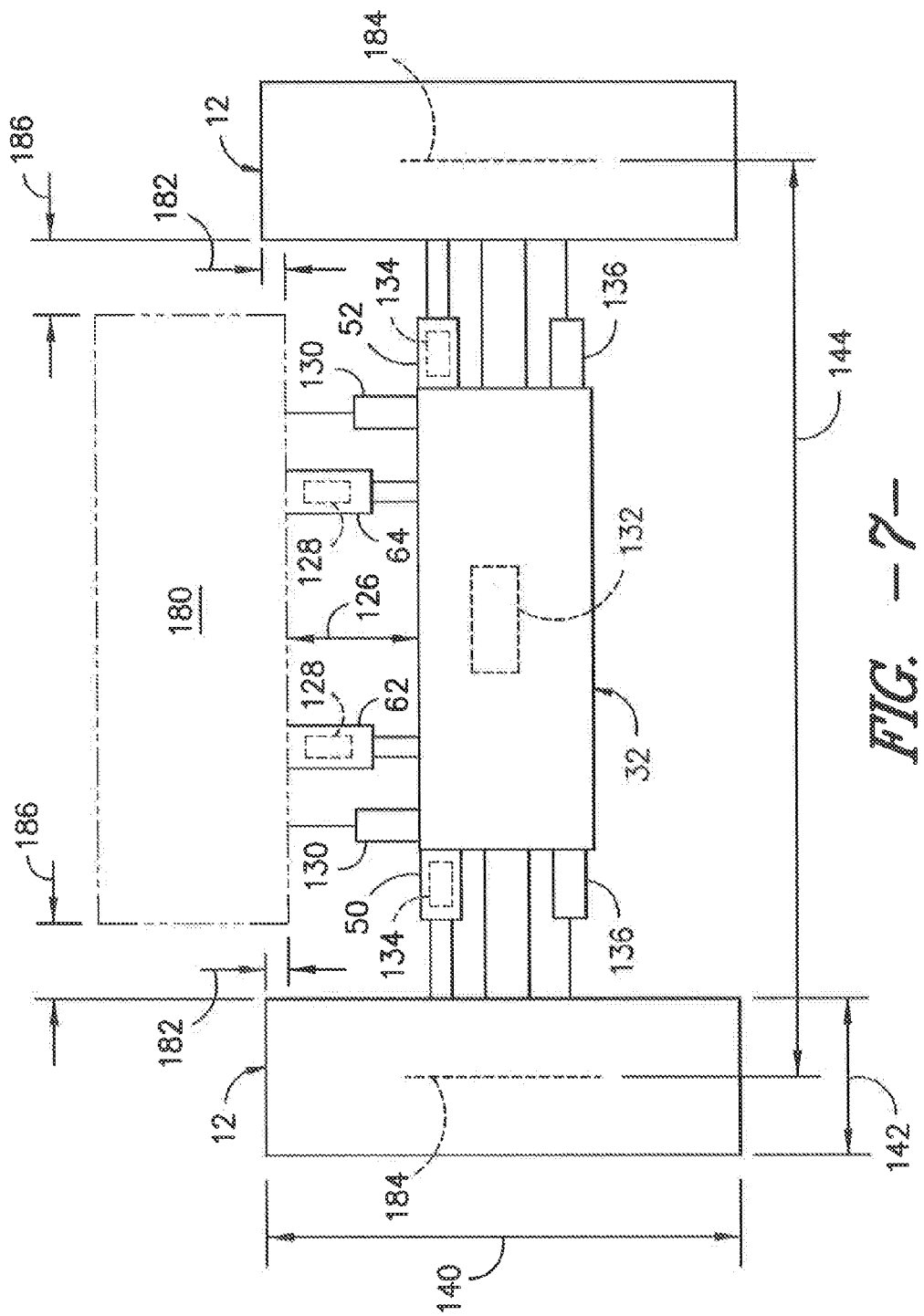
FIG. -7-

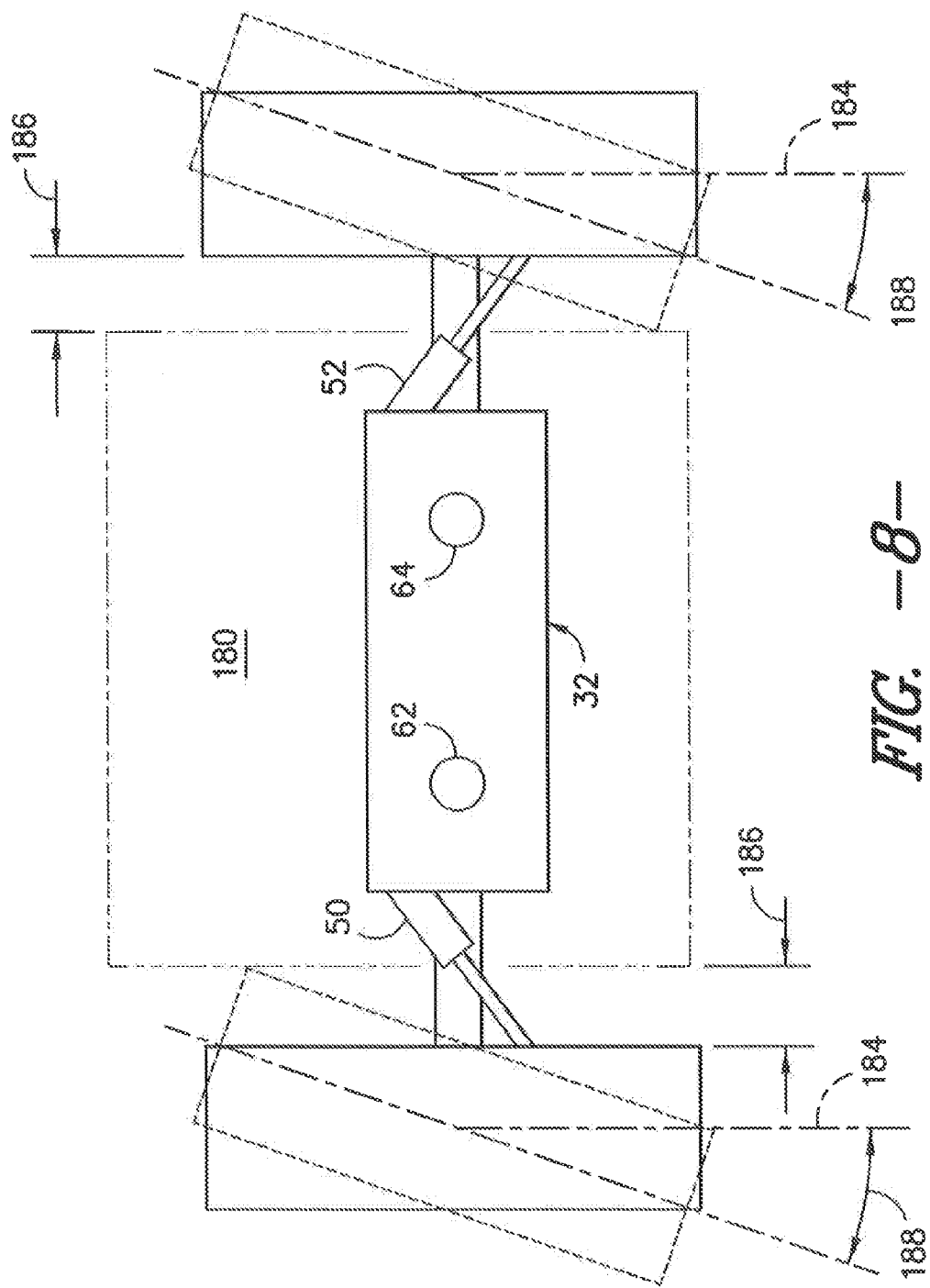
FIG. -8-

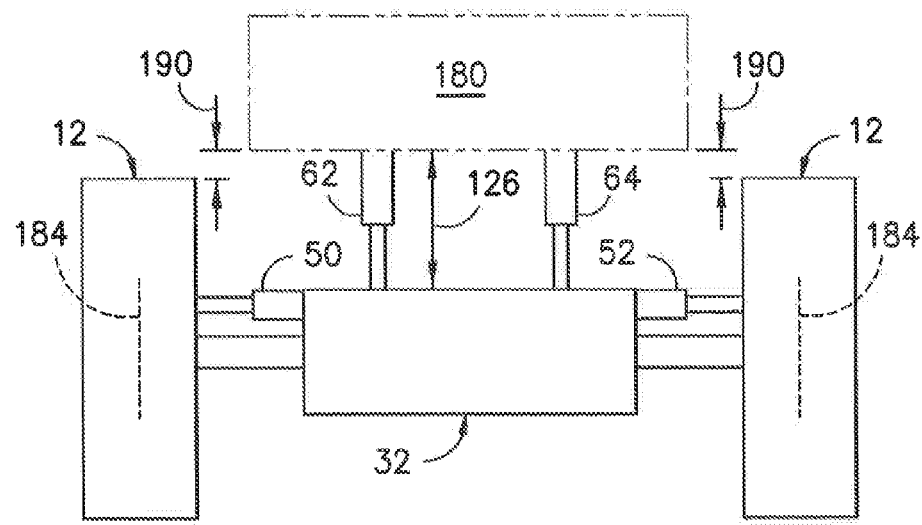
FIG. -9-
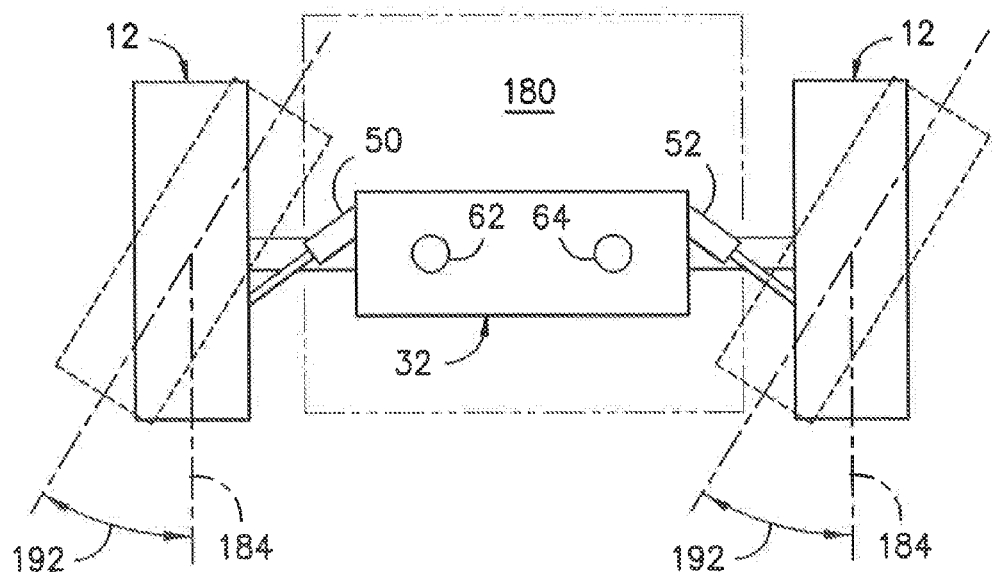
FIG. -10-

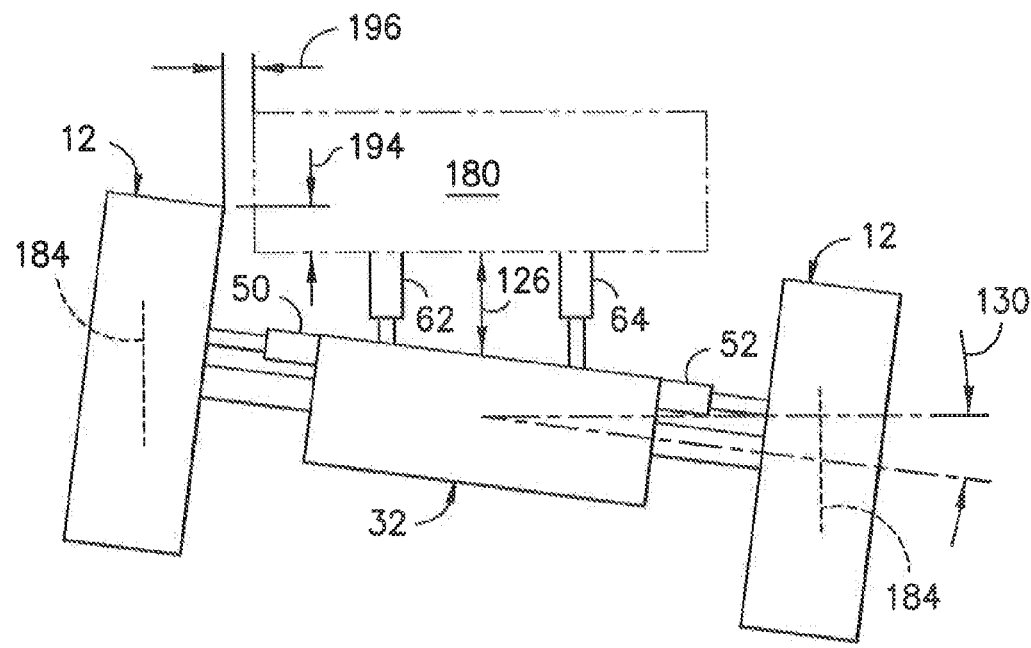
FIG. -11-
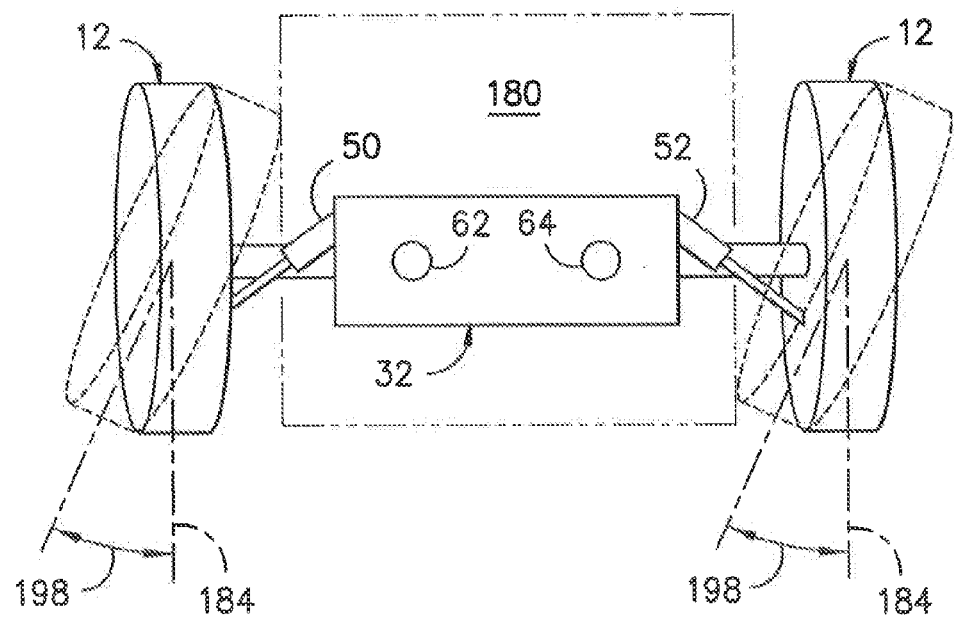
FIG. -12-

SYSTEM AND METHOD FOR ACTIVELY DETERMINING A STEERING STOP ANGLE FOR A WORK VEHICLE

FIELD OF THE INVENTION

The present subject matter generally relates to work vehicles and, more particularly, to a system and method for actively determining a steering stop angle for the front tires of a work vehicle having a suspended front axle or any other suitable front axle assembly.

BACKGROUND OF THE INVENTION

Work vehicles, such as tractors and other agricultural vehicles, typically include a suspension system configured to damp vibrations caused by uneven field conditions. The suspension system often includes an axle configured to support one or more wheels on each of its ends and an axle carrier extending between the axle and a frame or chassis of the work vehicle. The axle carrier may generally be configured to rotate relative to the frame about a lateral axis to facilitate vertical movement of the axle. In addition, the axle may be configured to pivot about the axle carrier to enable the axle to oscillate about a substantially longitudinal axis. Moreover, the suspension system may also include actuating cylinders coupled to the axle that are configured to damp vertical and oscillatory movement of the axle, thereby enhancing ride quality, reducing operator fatigue and reducing wear on certain work vehicle components.

Certain work vehicles also include a steering assembly configured to rotate each wheel and, thus, each associated tire relative to the axle across a range of steering angles. To prevent contact and/or damage to the various components positioned adjacent to the tires (e.g., hood, engine, frame, etc.) while the tires are being rotated, conventional steering assemblies typically include mechanical stops that limit both the steering angle of the tires as well as the oscillatory movement of the axle. As a result, the steering performance of work vehicles including such mechanical stops is often quite limited. Moreover, the mechanical stops must be manually adjusted by the operator to accommodate changes in the front-end configuration of the work vehicle (e.g., when larger tires are installed onto the vehicle and/or when the tire tread width of the vehicle is adjusted). Unfortunately, the manner in which the stops must be adjusted can be confusing, which leads to incorrect adjustments resulting in damage to adjacent vehicle components when the tires contact and/or rub against such components while the vehicle is being steered. In addition, the failure to properly adjust the positioning of the stops may also lead to inefficient vehicle operation.

Accordingly, an improved system and method for actively determining a steering stop angle for a work vehicle that allows for the steering performance of the vehicle to be optimized while preventing damage to adjacent vehicle components would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for actively determining a steering stop angle for tires associated with a front axle of a work vehicle. The method may generally include receiving an input associated with a tire parameter for the tires and monitoring a suspension travel distance of the front axle. The suspension travel distance may be associated with a vertical position of the tires relative to at least one hood-related component of the work vehicle. The method may also include monitoring an oscillation angle of the front axle. The oscillation angle may be associated with at least one of the vertical position or a horizontal position of the tires relative to the at least one hood-related component. In addition, the method may include determining a maximum allowable steering angle for the tires based on both the suspension travel distance and the oscillation angle of the front axle, wherein the maximum allowable steering angle corresponds to a steering angle at which clearance is maintained between the tires and the at least one hood-related component when the tires are position at the maximum steering angle.

In another aspect, the present subject matter is directed to a system for actively determining a steering stop angle for tires associated with a front axle of a work vehicle. The system may generally include a controller having a processor and associated memory. The memory may include computer-readable instructions that, when implemented by the processor, configure the controller to receive an input associated with a tire parameter for the tires and monitor a suspension travel distance of the front axle. The suspension travel distance may be associated with a vertical position of the tires relative to at least one hood-related component of the work vehicle. The controller may also be configured to monitor an oscillation angle of the front axle. The oscillation angle may be associated with at least one of the vertical position or a horizontal position of the tires relative to the at least one hood-related component. In addition, the controller may be configured to determine a maximum allowable steering angle for the tires based on both the suspension travel distance and the oscillation angle of the front axle. The maximum allowable steering angle may correspond to a steering angle at which a clearance is maintained between the tires and the at least one hood-related component when the tires are position at the maximum steering angle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a side view of one embodiment of a work vehicle in accordance with aspects of the present subject matter;

FIG. 2 illustrates a front, perspective view of one embodiment of a suspension system installed under a hood of the work vehicle shown in FIG. 1 in accordance with aspects of the present subject matter;

FIG. 3 illustrates a top view of the suspension system shown in FIG. 2;

FIG. 4 illustrates a front view of the suspension system shown in FIG. 2;

FIG. 5 illustrates a schematic view of one embodiment of a system for actively determining a steering stop angle for a work vehicle in accordance with aspects of the present subject matter;

FIG. 6 illustrates a flow diagram of one embodiment of a method for actively determining a steering stop angle for a work vehicle in accordance with aspects of the present subject matter;

FIG. 7 illustrates a schematic, front view of a front axle and front tires of a work vehicle in accordance with aspects of the present subject matter, particularly illustrating the positioning of the front tires relative to a hood-related component of the work vehicle;

FIG. 8 illustrates a schematic, top view of the vehicle components shown in FIG. 7, particularly illustrating the steering angle at which the front tires contact the hood-related component due to the relative positioning of such components;

FIG. 9 illustrates another schematic, front view of the vehicle components shown in FIG. 7, particularly illustrating the positioning of the front tires relative to the hood-related component after the suspension travel distance of the front axle has changed;

FIG. 10 illustrates a schematic, top view of the vehicle components shown in FIG. 9, particularly illustrating an example of a steering angle that may be achieved due to the relative positioning of such components;

FIG. 11 illustrates another schematic, front view of the vehicle components shown in FIG. 7, particularly illustrating the positioning of the front tires relative to the hood-related component after the oscillation angle of the front axle has changed; and FIG. 12 illustrates a schematic, top view of the vehicle components shown in FIG. 11, particularly illustrating the steering angle at which the front tires contact the hood-related component due to the relative positioning of such components.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for actively determining a steering stop angle for a work vehicle. Specifically, in several embodiments, a controller of the work vehicle may be configured to actively monitor one or more axle-related parameters associated with a front axle of the vehicle. For instance, as will be described below, the controller may be configured to continuously monitor both a suspension travel distance and an oscillation angle of the front axle as the work vehicle is being operated. Based on such monitored parameters, along with inputs received related to one or more fixed tire parameters (e.g., tire size and/or tire tread width), the controller may be configured to determine a maximum allowable steering angle to which the vehicle's front tires may be rotated without contacting a hood-related component of the work vehicle (e.g., the hood and/or a under-hood component of the vehicle). The controller may then be configured to control the operation of a steering assembly of the work vehicle in a manner that prevents the front tires from being rotated beyond the maximum allowable steering angle determined for the front tires.

It should be appreciated that, in several embodiments, the controller may also be configured to monitor one or more vehicle parameters of the work vehicle, such as the vehicle's ground speed. For instance, a slow ground speed may provide an indication that the vehicle is performing work (e.g., field work) in which optimized steering is desirable whereas higher ground speeds (e.g., during road transport) may provide an indication that optimized steering is not critical. Thus, by monitoring the ground speed, the controller may be configured to adapt its control of the various vehicle components.

Additionally, in several embodiments, the controller may also be configured to actively control the vehicle's suspension cylinders in order to limit the suspension travel distance and/or the oscillation angle of the front axle in a manner that prevents contact between the tires and any adjacent hood-related components. For instance, while a work vehicle is in the process of turning, its front tires may be positioned at a steering angle that is less than the maximum allowable steering angle determined based on the current suspension travel distance and oscillation angle of the front axle. However, if a given change in the suspension travel distance and/or the oscillation angle would cause the front tires to contact any of the adjacent hood-related components, the controller may be configured to limit and/or adjust the suspension travel distance and/or the oscillation angle of the front axle by actively controlling the operation of the suspension cylinders in a manner that prevents such contact.

Referring now to the drawings, FIG. 1 illustrates a side view of one embodiment of a work vehicle 10 in accordance with aspects of the present subject matter. As shown, the work vehicle 10 is configured as an agricultural tractor. However, in other embodiments, the work vehicle 10 may be configured as any other suitable work vehicle known in the art, such as various other agricultural vehicles, earth-moving vehicles, loaders and/or various other off-road vehicles.

As shown in FIG. 1, the work vehicle 10 includes a pair of front wheels (and associated front tires 12), a pair or rear wheels (and associated rear tires 14) and a frame or chassis 16 coupled to and supported by the wheels. However, in other embodiments, the work vehicle 10 may include two or more pairs of front tires 12 and/or two or more pairs of rear tires 14, such as in the case of a dual or triple tire configuration. An operator's cab 18 may be supported by a portion of the chassis 16 and may house various input devices 20, 21 for permitting an operator to control the operation of the work vehicle 10. Additionally, the work vehicle 10 may include an engine 22 and a transmission 24 mounted on the chassis 16. The transmission 24 may be operably coupled to the engine 22 and may provide variably adjusted gear ratios for transferring engine power to the wheels via a drive axle assembly 26.

The work vehicle 10 may also include a hood 28 extending from the cab 18 towards the front end of the vehicle 10. As is generally understood, the hood 28 may be configured to house the engine 22 and various other under-hood components of the work vehicle 10 (e.g., various hydraulic systems, pneumatic systems, electrical systems, mechanical systems, fluid storage tanks and/or the like). For instance, as will be described below, a suspension system 30 (FIGS. 2-4) may be disposed under the hood 28 that allows for a front axle 32 of the work vehicle 10 to move relative to the chassis 16. Specifically, the suspension system 30 may be configured such that the front axle 32 is capable of moving vertically relative to the chassis 16 as well as pivoting or oscillating relative to the chassis 16, thereby providing a means for damping both vertical and oscillatory movement of the front axle 32.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration 10. For example, in an alternative embodiment, a separate frame or chassis may be provided to which the engine 22, transmission 24, and drive axle assembly 26 are coupled, a configuration common in smaller tractors. Still other configurations may use an articulated chassis to steer the work vehicle 10, or rely on tracks in lieu of the tires 12, 14. Additionally, although not shown, the work vehicle 10 may also be configured to be operably coupled to any suitable type of work implement, such as a trailer, spray boom, manure tank, feed grinder, plow and/or the like.

Referring now to FIG. 2-4, a several views of one embodiment of a suspension system 30 suitable for use with the work vehicle 10 shown in FIG. 1 is illustrated in accordance with aspects of the present subject matter. Specifically, FIG. 2 illustrates a front, perspective view of the suspension system 30 installed under the hood 28 of the work vehicle 10. Additionally, FIGS. 3 and 4 illustrate top and front views, respectively, of the suspension system 30.

As shown, the suspension system 30 may include a front axle 32 extending between a first lateral end 34 (FIG. 4) and a second lateral end 36 (FIG. 4). In general, the front axle 32 may be configured to support a first front tire 12 of the work vehicle 10 at the first lateral end 34 and a second front tire 12 of the work vehicle 10 at the second lateral end 36. As shown in the illustrated embodiment, first and second hubs 38, 40 may be disposed at the first and second lateral ends 34, 36 for coupling the tires 12 to the front axle 32.

The suspension system may also include an axle carrier 42 configured to extend between the chassis 16 and the front axle 32. In general, the axle carrier 42 may be configured to rotate relative to the chassis 16 about a lateral axis L (FIG. 3) to facilitate vertical movement of the front axle 32 relative to chassis 16. For example, as particularly shown in FIG. 3, the axle carrier 42 may include pins 44 configured to rotatably couple the axle carrier 42 to the chassis 16, thereby allowing the axle carrier 42 to rotate relative to the chassis 16 about the lateral axis L. In addition, as shown in FIGS. 3 and 4, the axle carrier 42 may be configured to be coupled to the front axle 32 via a pin 46 to allow the front axle 32 to pivot or oscillate relative to the axle carrier 42 (and, thus, the chassis 16) about a longitudinal axis A (FIG. 3). As is generally understood, by allowing such vertical and oscillatory movement of the front axle 32 relative to the chassis 16, the associated work vehicle 10 may be configured to traverse uneven terrain while maintaining contact between the tires 12 and the ground.

In addition, the suspension system 30 may also include a steering assembly 48 configured to rotate each tire 12 relative to the front axle 32 about a substantially vertical axis. As shown in the illustrated embodiment, the steering assembly 48 may include a first steering cylinder 50 and a second steering cylinder 52. In general, each steering cylinder 50, 52 may be configured to extend between a central portion of the axle 32 and a knuckle 54 rotatably coupled to each lateral end 34, 36 of the axle 32. In addition, the steering assembly 48 may also include a tie rod 56 extending between the knuckles 54 to facilitate synchronized rotation of the tires 12 relative to the front axle 32.

As is generally understood, the steering assembly 48 may be configured to drive each knuckle 54 to rotate about a kingpin (not shown), which, in turn, rotates the hubs 38, 40 and, thus, the attached front tires 12 of the work vehicle 10. For example, as shown in FIG. 3, extension of a piston rod of the first steering cylinder 50 and retraction of a piston rod of the second steering cylinder 52 may induce the front tires 12 to rotate in a clockwise direction 58 across a given range of steering angles. Conversely, retraction of the piston rod of the first steering cylinder 50 and extension of the piston rod of the second steering cylinder 52 may induce the tires 12 to rotate in a counter-clockwise direction 60 across a given range of steering angles. As will be described below, by limiting the operation of the steering cylinders 50, 52 based on a determined steering stop angle (or maximum allowable steering angle) for the front tires 12, the work vehicle 10 may be steered while maintaining clearance between the tires 12 and one or more hood-related components of the vehicle 10.

In addition, the suspension system 30 may also include first and second suspension cylinders 62, 64 coupled between the font axle 32 and the chassis 16. Specifically, as shown in FIG. 4, the first suspension cylinder 62 may include a first end configured to be coupled to a first lateral side 66 of the front axle 32 and may extend upwardly to a second end configured to be coupled to the chassis 16. Similarly, the second suspension cylinder 64 may include a first end configured to be coupled to a second lateral side 68 of the front axle 32 and may extend upwardly to a second end configured to be coupled to the chassis 16.

As is generally understood, extension of the piston rods associated with the first and second suspension cylinders 62, 64 may induce the front axle 32 to move vertically downward (indicated by arrow 70 of FIG. 4) relative to the chassis 16 while retraction of the piston rods may induce the front axle 32 to move vertically upward (indicated by arrow 72 of FIG. 4) relative to the chassis 16. Moreover, when the amount of retraction/extension of each piston rod differs from the other, the front axle 32 may be configured to pivot or oscillate relative to the chassis 16 about the longitudinal axis A. For instance, with retraction of the piston rod associated with the first suspension cylinder 62 and extension of the piston rod associated with the second suspension cylinder 64, the front axle 32 may pivot or oscillate relative to the chassis 16 in a clockwise direction 74. Similarly, with extension of the piston rod associated with the first suspension cylinder 62 and retraction of the piston rod associated with the second suspension cylinder 64, the front axle 32 may pivot or oscillate relative to the chassis 16 in a counter-clockwise direction 76. Thus, the suspension cylinders 62, 64 may generally be configured to damp vertical and oscillatory movement of the front axle 32, thereby enhancing ride quality, reducing operator fatigue and reducing wear on certain components of the work vehicle 10. Additionally, as will be described below, by actively controlling the operation of the suspension cylinders 62, 64 while the work vehicle 10 is in the process of turning, the vertical and oscillatory movement of the front axle 32 may be limited in a manner that prevent contact between the front tires 12 and any hood-related components of the vehicle 10.

Referring now to FIG. 5, a schematic diagram of one embodiment of a control system 100 for actively determining a steering stop angle for a work vehicle is illustrated in accordance with aspects of the present subject matter. In general, the system 100 will be described herein with reference to the work vehicle 10 and suspension system 30 described above with reference to FIGS. 1-4. However, it should be appreciated by those of ordinary skill in the art that the disclosed system 100 may generally be utilized with work vehicles 10 having any suitable vehicle configuration and/or any suitable suspension system.

As shown, the control system 100 may generally include a controller 102 configured to electronically control the operation of one or more components of the work vehicle 10, such as the various hydraulic components of the work vehicle 10 (e.g., the steering cylinders 50, 52 and/or the suspension cylinders 62, 64). In general, the controller 102 may comprise any suitable processor-based device known in the art, such as a computing device or any suitable combination of computing devices. Thus, in several embodiments, the controller 102 may include one or more processor(s) 104 and associated memory device(s) 106 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 106 of the controller 102 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 106 may generally be configured to store suitable computer-readable instructions that, when implemented by the processor(s) 104, configure the controller 102 to perform various computer-implemented functions, such as the method 200 described below with reference to FIG. 6. In addition, the controller 102 may also include various other suitable components, such as a communications circuit or module, one or more input/output channels, a data/control bus and/or the like.

It should be appreciated that the controller 102 may correspond to an existing controller of the work vehicle 10 or the controller 102 may correspond to a separate processing device. For instance, in one embodiment, the controller 102 may form all or part of a separate plug-in module that may be installed within the work vehicle 10 to allow for the disclosed system and method to be implemented without requiring additional software to be uploaded onto existing control devices of the vehicle 10.

In several embodiments, the controller 102 may be configured to be coupled to suitable components for controlling the operation of the steering cylinders 50, 52 of the work vehicle 10. For example, as shown in FIG. 5, the controller 102 may be communicatively coupled to suitable pressurize regulating valves 107, 108 (PRVs) (e.g., solenoid-activated valves) configured to regulate the pressure of hydraulic fluid supplied to each steering cylinder 50, 52. Specifically, as shown in the illustrated embodiment, the system 100 may include a first PRV 107 for regulating the pressure of the hydraulic fluid supplied to a cap end 110 of each steering cylinder 50, 52. In addition, the system 100 may include a second PRV 108 for regulating the pressure of the hydraulic fluid supplied to a rod end 112 of each steering cylinder 50, 52.

During operation, hydraulic fluid may be transmitted to the PRVs 107, 108 from a fluid tank 114 mounted on and/or within the work vehicle 10. The controller 102 may then be configured to regulate the current commands to each PRV 107, 108 in order to control the pressure of the hydraulic fluid supplied to each steering cylinder 50, 52. Specifically, the current supplied to each PRV 107, 108 is directly proportional to the pressure supplied to the steering cylinders 50, 52, which is, in turn, directly proportional to a stroke length 116 of the piston rod associated with each steering cylinder 50, 52. Thus, for example, by increasing the current command to the first PRV 107 and decreasing the current command to the second PRV 108, the pressure within the cap end 110 of each steering cylinder 50, 52 may be increased as the pressure within the rod end 112 of each steering cylinder 50, 52 is decreased, thereby pushing the piston rod outwardly and increasing the stoke length 116. Similarly, by decreasing the current command to the first PRV 107 and increasing the current command to the second PRV 108, the pressure within the cap end 110 of each steering cylinder 50, 52 may be decreased as the pressure within the rod end 112 of each steering cylinder 50, 52 is increased, thereby pulling the piston rod inwardly and decreasing the stoke length 116. Thus, by controlling the actuation of the steering cylinders 50, 52, the controller 102 may, in turn, be configured to automatically control the associated steering angle of the front tires 12. As will be described below, such control of the steering angle may allow the controller 102 to prevent the front tires 12 from being rotated beyond their maximum allowable steering angle, thereby ensuring that the tires 12 do not contact one or more hood-related components of the work vehicle 10 as the vehicle 10 is being turned.

In addition, the controller 102 may be configured to similarly control the operation of the suspension cylinders 62, 64. For example, in several embodiments, the controller 102 may be communicatively coupled to suitable pressurize regulating valves (PRVs) (e.g., solenoid-activated valves) configured to regulate the pressure of the hydraulic fluid supplied to each cylinder 62, 64. Specifically, as shown schematically in FIG. 3, the controller 102 may be coupled to both a first PRV 150 configured to regulate the pressure of the hydraulic fluid supplied to a rod end 154 of one of the suspension cylinders 62, 64 and a second PRV 152 configured to regulate the pressure of the hydraulic fluid supplied to a cap end 156 of such cylinder 62, 64. In such an embodiment, the current supplied to each PRV 150, 152 may be directly proportional to the pressure supplied at each end 154, 156 of the cylinder 62, 64, thereby allowing the controller 102 to control the displacement of the cylinder 62, 64. It should be appreciated that, although FIG. 3 only illustrates the controller 102 coupled to suitable PRVs for controlling the operation of one of the suspension cylinders 62, 64, similar hydraulic components may be utilized to control the other suspension cylinder 62, 64. For instance, the controller 102 may be coupled to another pair of PRVs configured to control the pressure of the hydraulic fluid supplied to each end of the other suspension cylinder 62, 64, thereby allowing the displacement of each cylinder 62, 64 to be independently controlled.

Additionally, as shown in FIG. 5, the controller 102 may be communicatively coupled to one or more input devices 118 for providing operator inputs to the controller 102. For instance, the controller 102 may be coupled to a control panel and/or any other suitable input device housed within the operator's cab 18 to allow operator inputs to be received by the controller 102. As will be described below, such operator inputs may include, for example, one or more tire parameters associated with the front tires 12 installed on the work vehicle 10.

Moreover, as shown in FIG. 5, the controller 102 may be communicatively coupled to a plurality of sensors 120, 122, 124 for monitoring one or more operating parameters associated with the work vehicle 10. For example, in several embodiments, the controller 102 may be coupled to a suspension travel sensor 120 for monitoring a suspension travel distance 126 (FIG. 7) corresponding to the vertical distance defined between a reference location on the front axle 32 and a reference location on the vehicle chassis 16 and/or any other suitable vehicle component. In general, the suspension travel sensor 120 may comprise any suitable sensor and/or combination of sensors that allows for the suspension travel distance 126 of the front axle 32 to be measured directly or indirectly. For instance, in one embodiment, the suspension travel sensor 120 may comprise one or more pressure sensors 128 (FIG. 7) for monitoring the pressure(s) of the hydraulic fluid supplied within the suspension cylinders 60, 62. By monitoring such pressure(s), the stroke lengths of the piston rods associated with each suspension cylinder 60, 62 may be determined, which may, in turn, allow for the calculation of the suspension travel distance 126. In another embodiment, the suspension travel sensor 120 may comprise one or more position sensors 130 configured to directly monitor the position of the front axle 32 relative to the chassis 16 or any other suitable component of the work vehicle 10. For instance, suitable position sensors may include potentiometers, proximity sensors and/or the like.

As shown in FIG. 5, the controller 102 may also be coupled to an oscillation angle sensor 122 for monitoring an oscillation angle 130 (FIG. 11) of the front axle 32 relative to a horizontal plane. In general, the oscillation angle sensor 122 may comprise any suitable sensor and/or combination of sensors that allows for the oscillation angle 130 to be measured directly or indirectly. For instance, in one embodiment, the oscillation angle sensor 122 may comprise one or more pressure sensors 128 (FIG. 7) for monitoring the pressure(s) of the hydraulic fluid supplied within the suspension cylinders 60, 62. By monitoring such pressure(s), the stroke length of the piston rod associated with each suspension cylinder 60, 62 may be determined. Thus, by knowing the horizontal spacing between the steering cylinders 60, 62, the oscillation angle 130 of the front axle 32 may then be determined based on the relative displacement of the piston rods. In another embodiment, the oscillation angle sensor 122 may comprise one or more position sensors 130 (FIG. 7) configured to monitor the position of the front axle 32 relative to the chassis 16 or any other suitable component of the work vehicle 10, which may then be utilized to determine the oscillation angle 130. For instance, a first potentiometer may be used to monitor the position of a first portion of the front axle 32 and a second potentiometer may be used to monitor the position of a second portion of the front axle 32. By knowing the spacing between the potentiometers, the oscillation angle 130 of the front axle 32 may then be determined based on a comparison of the position measurements. In a further embodiment, the oscillation angle sensor 122 may comprise one or more tilt or orientation sensors 132 configured to directly monitor the oscillation angle 130 of the front axle 32. For instance, suitable orientation sensors may include gyroscopes, accelerometers and/or the like.

Moreover, as shown in FIG. 5, the controller 102 may also be coupled to a steering angle sensor 124 for monitoring the current steering angle of the front tires 12. In general, the steering angle sensor 124 may comprise any suitable sensor and/or combination of sensors that allows for the steering angle to be measured directly or indirectly. For instance, in one embodiment, the steering sensor may comprise one or more pressure sensors 134 (FIG. 7) for monitoring the pressure(s) of the hydraulic fluid supplied within the steering cylinders 50, 52. By monitoring such pressure(s), the stroke lengths 116 of the piston rods associated with the steering cylinders 50, 52 may be determined, which may, in turn, allow for the calculation of the current steering angle of the front tires 12. In another embodiment, the steering angle sensor 124 may comprise one or more position sensors 136 configured to monitor the current position of the front tires 12 relative to a given reference point, which may then be used to determine the steering angle of the tires 12. For instance, suitable position sensors may include potentiometers, proximity sensors and/or the like.

It should be appreciated that the controller 102 may also be coupled to any other suitable sensor(s) configured to monitor any other suitable operating parameters of the work vehicle 10. For instance, in one embodiment, the controller 102 may be coupled to a ground speed sensor (not shown) to allow the controller 102 to monitor the ground speed of the work vehicle 10.

Referring now to FIG. 6, a flow diagram of one embodiment of a method 200 for actively determining a steering stop angle for a work vehicle is illustrated in accordance with aspects of the present subject matter. In general, the method 200 will be described with reference to the work vehicle 10 and the system 100 described above with reference to FIGS. 1-5. However, it should be appreciated by those of ordinary skill in the art that the disclosed method 200 may generally be utilized to actively adjust the steering angle range for work vehicles having any suitable configuration and/or any suitable control system. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

It should also be appreciated that the disclosed method 200 will generally be described herein with reference to a hood-related component(s) of the work vehicle 10. In general, the term "hood-related component" may refer to the hood 28 of the work vehicle 10 and/or any under-hood components of the work vehicle 10, such as any hydraulic component(s) (e.g., hydraulic lines), pneumatic component(s), electrical component(s) (e.g., electrical wire harnesses), mechanical component(s) (e.g., mechanical drive shafts), storage tank(s), portions of the chassis 16 and/or any other suitable components housed within, installed underneath and/or otherwise positioned vertically below the hood 28. As will be described below, depending on the arrangement and/or positioning of the "hood-related components" for a given work vehicle 10, such components may serve to limit the allowable steering angle range for the vehicle.

In general, the disclosed method 200 may be utilized to actively and dynamically determine a maximum allowable steering angle (i.e., the steering stop angle) to which the front tires 12 of a work vehicle 10 may be rotated at any given point during vehicle operation without contacting one or more hood-related components of the work vehicle 10. For instance, based on the size and spacing of the front tires 12 as well the front-end configuration of the work vehicle 10 (e.g., the or arrangement and/or positioning of the various hood-related components of the vehicle 10), a given amount of clearance may be defined between the front tires 12 and any adjacent hood-related components when a specific suspension travel distance 126 and oscillation angle 130 is defined by the front axle 32, thereby allowing the tires 12 to be rotated to a particular steering angle without contacting the adjacent hood-related component(s). However, as will be described below, changes in the travel suspension distance 126 and/or the oscillation angle 130 may significantly impact the positioning and/or clearance of the front tires 12 relative to the adjacent hood-related component(s). Thus, by monitoring such variables, the system controller 102 may be configured to continuously update the maximum allowable steering angle based on the current positioning of the front tires 12 relative to such adjacent hood-related component(s). This maximum allowable steering angle may then define the steering stop angle to which the steering cylinders 50, 52 may be allowed to rotate the tires 12 during vehicle operation.

As shown in FIG. 6, at (202), the method 200 includes receiving an input associated with a tire parameter for the front tires 12. As indicated above, the controller 102 may be configured to receive operator inputs from one or more input devices 118 of the work vehicle 10, such as a control panel housed within the cab 18. Thus, in several embodiments, the operator may be instructed to provide an operator input(s) (e.g., via the control panel) associated with one or more tire parameters for the front tires 12. For instance, in one embodiment, the operator may be instructed to provide inputs associated with the size of the front tires 12, such as a diameter or height 140 of the front tires 12 (FIG. 7) and/or a width 142 of the front tires 12 (FIG. 7), the number of front tires 12 (e.g., a single, dual or triple tire configuration) and/or the spacing of the front tires 12, such as a tire tread width 144 (FIG. 7) defined from the center of the left front tire 12 to the center of the right front tire 12. Upon receipt, such tire parameters may be stored within the controller's memory 106 for subsequent use by the controller 102 as an input for determining the maximum allowable steering angle for the tires 12.

Additionally, at (204), the method 200 includes monitoring the suspension travel distance associated with the front axle. As indicated above, the suspension travel distance 126 (FIG. 7) may be directly or indirectly measured using a suitable suspension travel sensor 120 (FIG. 5). The sensor measurements provided by the sensor 120 may then be transmitted to the system controller 102 to allow it to continuously monitor the suspension travel distance 126 during operation of the work vehicle 10. As will be described below, in addition to defining the vertical position of the front axle 32, the suspension travel distance 126 may also be associated with or otherwise related to the vertical positioning of the front tires 12 relative to any adjacent hood-related components of the work vehicle 10. As such, the suspension travel distance 126 may significantly impact the maximum allowable steering angle defined for the tires 12.

Moreover, at (206), the method 200 includes monitoring the oscillation angle of the front axle. As indicated above, the oscillation angle 130 (FIG. 11) may be directly or indirectly measured using a suitable oscillation angle sensor 122 (FIG. 5). The sensor measurements provided by the sensor 122 may then be transmitted to the controller 102 to allow it to continuously monitor the oscillation angle 130 during operation of the work vehicle 10. As will be described below, in addition to defining the angular orientation of the front axle 32, the oscillation angle 130 may also be associated with or otherwise related to both the vertical and horizontal positioning of the front tires 12 relative to any adjacent hood-related components of the work vehicle 10. Thus similar to the suspension travel distance 126, the oscillation angle 130 of the front axle 32 may significantly impact the maximum allowable steering angle defined for the tires 12.

Referring still to FIG. 6, at (208), the method 200 includes determining a maximum allowable steering angle for the front tires 12 based on both the suspension travel distance 126 and the oscillation angle 130 of the front axle 32. Specifically, as indicated above, the controller 102 may be configured to receive inputs associated with the size, number and spacing of the vehicle's front tires 12, thereby providing the controller 102 with reference data related to the positioning of the tires 12 relative to the various hood-related components disposed at the front-end of the work vehicle 10. Thus, by identifying changes in the suspension travel distance 126 and/or the oscillation angle 130, the controller 102 may be configured to determine a maximum allowable steering angle to which the front tires 12 may be rotated without contacting any adjacent hood-related component(s) of the work vehicle 10.

For instance, FIGS. 7-12 illustrate examples in which the maximum allowable steering angle determined by the controller 102 may vary based on the suspension travel distance 126 and/or the oscillation angle 130 of the front axle 32. Specifically, FIGS. 7 and 8 illustrate front and top schematic views, respectively, of the front axle 32 and the front tires 12 of a work vehicle 10, particularly illustrating the positioning of the front tires 12 relative to a hood-related component 180 of the work vehicle 10. FIGS. 9 and 10 illustrate front and top schematic views, respectively, of the front axle 32 and front tires 12 shown in FIGS. 7 and 8 after the suspension travel distance 126 of the front axle 32 has changed, thereby altering the positioning of the front tires 12 relative to the hood-related component 180. Additionally, FIGS. 11 and 12 illustrate front and top schematic views, respectively, of the front axle 32 and front tires 12 shown in FIGS. 7 and 8 after the oscillation angle 130 of the front axle 32 has changed, thereby altering the positioning of the front tires 12 relative to the hood-related component 180.

As shown in FIG. 7, at a given suspension travel distance 126 and at a zero oscillation angle, the front tires 12 may, for example, be positioned relative to a hood-related component 180 of the work vehicle 10 such that the tires 12 vertically overlap the hood-related component by a vertical length 182. Due to such vertical overlap, the front tires 12 may be configured to contact the hood-related component 180 as the tires 12 are rotated clockwise or counter-clockwise relative a vertical reference plane 184 defining the zero steering angle position for the tires 12. For instance, as shown in FIG. 8, when positioned at a zero steering angle (indicated by the solid lines), the front tires 12 may be spaced horizontally from the hood-related component by a horizontal length 186. However, as the front tires 12 are rotated away from this zero steering angle position, the horizontal length 186 may be reduced until the tires 12 contact the hood-related component 180. For instance, as shown in FIG. 8, the front tires 12 may be configured to contact the hood-related component 180 when moved to a steering angle 188 defined relative to the vertical reference plane 184. Thus, in order to maintain clearance between the front tires 12 and the hood-related component 180 during vehicle operation, a maximum allowable steering angle may be selected for the front tires 12 that corresponds to a steering angle that is less than the steering angle 188, such as a steering angle that is equal to about 90% of the steering angle 188 or about 95% of the steering angle 188 or about 99% of the steering angle 188.

Alternatively, in the example shown in FIGS. 9 and 10, the suspension travel distance 126 for the front axle 32 has been increased as compared to that shown in FIGS. 7 and 8 such that the front tires 12 no longer vertically overlap the hood-related component 180. For instance, as shown in FIG. 9, a vertical clearance 190 is defined between the front tires 12 and the hood-related component 180. As such, when adjusting the steering angle, the tires 12 may be rotated below the hood-related component 180 to a steering angle 192 that is greater than the steering angle 188 shown in FIG. 10. In such instance, instead of being limited by the hood-related component 180, the maximum allowable steering angle may be selected based on the positioning of the front tires 12 relative to any other suitable hood-related components of the work vehicle 10 and/or based on the capabilities of the steering assembly (e.g., the maximum allowable stoke for the steering cylinders 50, 52).

Similarly, in the example shown in FIGS. 11 and 12, the front axle 32 has been pivoted or otherwise oscillated in the clockwise direction as compared to that shown in FIGS. 7 and 8 such that the front axle 32 defines a non-zero oscillation angle 130. Thus, in addition to vertically overlapping the hood-related component 180 by a given vertical length 194, the horizontal length 196 defined between the left front tire 12 and the hood-related component 180 at the zero steering angle position has been significantly reduced. As such, the front tires 12 may be configured to contact the hood-related component 180 at a steering angle 198 that is less than the steering angle 188 described above. Thus, in order to maintain a clearance between the front tires 12 and the hood-related component 180, a maximum allowable steering angle may be selected for the front tires 12 that corresponds to a steering angle that is less than the steering angle 198, such as a steering angle that is equal to about 90% of steering angle 198 or about 95% of the steering angle 198 or about 99% of the steering angle 198.

It should be appreciated that FIGS. 7-12 are illustrated simply to provide examples of how the maximum allowable steering angle may vary depending on the suspension travel distance 126 and the oscillation angle 130 of the front axle 32. However, those of ordinary skill in the art should readily appreciate that the maximum allowable steering angle for a work vehicle 10 at a given suspension travel distance 126 and oscillation angle 130 may generally vary from work vehicle to work vehicle depending on the front end configuration of the vehicle 10 (e.g., the arrangement and positioning of the various hood-related components of the vehicle 10) as well as the size, number and spacing of the front tires 12.

Thus, it should be appreciated that, in several embodiments, computer modeling and/or physical testing may be performed to collect data that relates the maximum allowable steering angle to both the suspension travel distance 126 and the oscillation angle 130 for a given vehicle configuration. For instance, in one embodiment, a three-dimensional model of the front end of a work vehicle 10 may be created that allows the tire size and number, tire spacing, suspension travel distance 126 and oscillation angle 130 to be varied. In such an embodiment, by analyzing the available clearance defined between the front tires 12 and the relevant hood-related components at each potential combination of tire size, tire spacing, suspension travel distance and oscillation angle, a mathematical relationship(s) and/or a look-up table(s) may be developed that relates such variables to the maximum allowable steering angle. This relationship(s) and/or look-up table(s) may then be stored within the controller's memory 106 and subsequently utilized to determine the maximum allowable steering angle based on the operator inputs and sensor measurements received by the controller 102.

Referring back to FIG. 6, at 210, the method 200 includes controlling the operation of the steering cylinders 50, 52 of the work vehicle 10 based on the maximum allowable steering angle. Specifically, in several embodiments, the controller 102 may be configured to control the operation of the steering cylinders 50, 52 in a manner that prevents the front tires 12 from being rotated beyond the maximum allowable steering angle. As indicated above, such control of the steering cylinders 50, 52 may be achieved by regulating the current command transmitted to the associated PRVs 107, 108, which, in turn, controls the pressure of the hydraulic fluid supplied to the cylinders 50, 52. Thus, by limiting the maximum pressure that can be supplied to each steering cylinder 50, 52 based on the maximum allowable steering angle, the tires 12 may be prevented from being rotated beyond the maximum allowable steering angle Additionally, as indicated above, the controller 102 may also be configured to actively control the operation of the suspension cylinders 62, 64 to account for changes in the suspension travel distance 126 and/or the oscillation angle 130 that may result in contact between the front tires 12 and any adjacent hood-related components. For example, a work vehicle may enter a turn with the front tires 12 rotated to a steering angle that is less than the maximum allowable steering angle determined for the current suspension travel distance 126 and oscillation angle 130 of the front axle 32. However, during the turn, it may be possible for the suspension travel distance 126 and/or the oscillation angle 130 to vary in a manner that would cause the front tires 12 to contact one or more adjacent hood-related components, even without any change to the tires' steering angle. In such instance, the operation of the suspension cylinders 62, 64 may be controlled so as to prevent any changes in the suspension travel distance 126 and/or the oscillation angle 130 that would cause such contact. For instance, if a further decrease in the suspension travel distance and/or a further increase in the oscillation angle would result in contact between the tires and any hood-related components, the controller may be configured to control the operation of the cylinders 62, 64 in a manner that limits such further changes.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for actively determining a steering stop angle for tires associated with a front axle of a work vehicle, the method comprising:
receiving, with a computing device, an input associated with a tire parameter for the tires;
monitoring, with the computing, device, a current suspension travel distance of the front axle, the suspension travel distance being associated with a vertical position of the tires relative to at least one hood-related component of the work vehicle;
monitoring, with the computing device, a current oscillation angle of the front axle, the oscillation angle being associated with at least one of the vertical position or a horizontal position of the tires relative to the at least one hood-related component;
dynamically determining, with the computing device, a maximum allowable steering angle for the tires based on both the current suspension travel distance and the current oscillation angle of the front axle, the maximum allowable steering angle corresponding to a steering angle at which clearance is maintained between the tires and the at least one hood-related component when the tires are positioned at the maximum steering angle; and
actively controlling, with the computing device, an operation of a steering cylinder associated with the front axle based on the dynamically determined maximum allowable steering angle.

2. The method of claim 1, further comprising receiving, with the computing device, measurement signals associated with the current suspension travel distance of the front axle from a first sensor communicatively coupled to the computing device.

3. The method of claim 2, wherein the first sensor comprises at least one of a pressure sensor configured to measure a pressure of hydraulic fluid supplied to a suspension cylinder of the work vehicle or a position sensor configured to measure a relative position of the front axle.

4. The method of claim 1, further comprising receiving, with the computing device, measurement signals associated with the current oscillation angle of the front axle from a second sensor communicatively coupled to the computing device.

5. The method of claim 4, wherein the second sensor comprises at least one of a pressure sensor configured to measure a pressure of hydraulic fluid supplied to a suspension cylinder of the work vehicle, a position sensor configured to measure a relative position of the front axle or an orientation sensor configured to measure an angular orientation of the front axle.

6. The method of claim 1, wherein dynamically determining the maximum allowable steering angle comprises continuously updating the maximum allowable steering angle based on changes in at least one of the current suspension travel distance or the current oscillation angle of the front axle as the work vehicle operated.

7. The method of claim 1, wherein the at least one hood-related component comprises at least one of a hood of the work vehicle or an under-hood component of the work vehicle.

8. The method of claim 1, wherein the tire parameter comprises at least one of a tire size of the tires or a tire tread width associated with the tires.

9. The method of claim 1, further comprising controlling, with the computing device, an operation of a suspension cylinder of the work vehicle to account for changes in at least one of the current suspension travel distance or the current oscillation angle while the work vehicle is being turned.

10. A system for actively determining a steering stop angle for tires associated with a front axle of a work vehicle, the system comprising:
a steering assembly configured to rotate each of the tires relative to the front axle, the steering assembly including a first steering cylinder and a second steering cylinder;
a controller configured to control an operation of the first and second steering cylinders, the controller including a processor and associated memory, the memory including computer-readable instructions that, when implemented by the processor, configure the controller to:
receive an input associated with a tire parameter for the tires;
monitoring a current suspension travel distance of the front axle, the suspension travel distance being associated with a vertical position of the tires relative to at least one hood-related component of the work vehicle;
monitor a current oscillation angle of the front axle, the oscillation angle being associated with at least one of the vertical position or a horizontal position of the tires relative to the at least one hood-related component;
dynamically determine a maximum allowable steering angle for the tires based on both the current suspension travel distance and the current oscillation angle of the front axle, the maximum allowable steering angle corresponding to a steering angle at which a clearance is maintained between the tires and the at least one hood-related component when the tires are position at the maximum steering angle; and
actively control the operation of at least one of the first steering cylinder or the second steering cylinder based on the dynamically determined maximum allowable steering angle.

11. The system of claim 10, further comprising a first sensor communicatively coupled to the controller, the first sensor being configured to transmit measurement signals to the controller associated with the current suspension travel distance of the front axle.

12. The system of claim 11, wherein the first sensor comprises at least one of a pressure sensor configured to measure a pressure of hydraulic fluid supplied to a suspension cylinder of the work vehicle or a position sensor configured to measure a relative position of the front axle.

13. The system of claim 10, further comprising a second sensor communicatively coupled to the controller, the second sensor being configured to transmit measurement signals to the controller associated with the current oscillation angle of the front axle.

14. The system of claim 13, wherein the second sensor comprises at least one of a pressure sensor configured to measure a pressure of hydraulic fluid supplied to a suspension cylinder of the work vehicle, a position sensor configured to measure a relative position of the front axle or an orientation sensor configured to measure an angular orientation of the front axle.

15. The system of claim 10, wherein the controller is configured to dynamically determine the maximum allowable steering angle by continuously updating the maximum allowable steering angle based on changes in at least one of the current suspension travel distance or the current oscillation angle of the front axle as the work vehicle operated.

16. The system of claim 10, wherein the at least one hood-related component comprises at least one of a hood of the work vehicle or an under-hood component of the work vehicle.

17. The system of claim 10, wherein the tire parameter comprises at least one of a tire size of the tires or a tire tread width associated with the tires.

18. The system of claim 10, wherein the controller is further configured to control an operation of a suspension cylinder of the work vehicle to account for changes in at least one of the current suspension travel distance or the current oscillation angle while the work vehicle is being turned.

* * * * *